US012441106B2

(12) United States Patent
Woo et al.

(10) Patent No.: US 12,441,106 B2
(45) Date of Patent: Oct. 14, 2025

(54) APPARATUSES FOR SUPPLYING CHEMICAL LIQUID

(71) Applicant: Semes Co., Ltd., Cheonan-si (KR)

(72) Inventors: Jangmi Woo, Cheonan-si (KR); Kihoon Choi, Hwaseong-si (KR); Younghoon Jeong, Cheonan-si (KR); Myungjin Kim, Cheonan-si (KR)

(73) Assignee: Semes Co., Ltd., Cheonan-si (KR)

( * ) Notice: Subject to any disclaimer, the term of this patent is extended or adjusted under 35 U.S.C. 154(b) by 570 days.

(21) Appl. No.: 17/815,617

(22) Filed: Jul. 28, 2022

(65) Prior Publication Data

US 2023/0037419 A1 Feb. 9, 2023

(30) Foreign Application Priority Data

Aug. 6, 2021 (KR) ........................ 10-2021-0103985

(51) Int. Cl.
*B41J 2/11* (2006.01)
*B41J 2/045* (2006.01)
(Continued)

(52) U.S. Cl.
CPC ............. *B41J 2/11* (2013.01); *B41J 2/04583* (2013.01); *B41J 2/14451* (2013.01); *B41J 2/17596* (2013.01)

(58) Field of Classification Search
CPC ...... B41J 2/11; B41J 2/04583; B41J 2/14451; B41J 2/17596
See application file for complete search history.

(56) References Cited

U.S. PATENT DOCUMENTS 7,597,434 B2 * 10/2009 Nitta .................... B41J 2/17566 347/85
9,776,420 B2 * 10/2017 Nitta ........................ B41J 2/175
(Continued)

FOREIGN PATENT DOCUMENTS

CN 105383181 A 3/2016
EP 3424713 B1 * 9/2020
(Continued)

OTHER PUBLICATIONS

English Machine Translation of EP 3424713 B1 (Year: 2020).*
(Continued)

*Primary Examiner* — Charles S Bushey
(74) *Attorney, Agent, or Firm* — DALY, CROWLEY, MOFFORD & DURKEE, LLP

(57) ABSTRACT

An apparatus for supplying chemical liquid may include at least two ink jet heads, a reservoir for receiving a chemical liquid provided onto a substrate from each of the at least two ink jet heads, a chemical liquid supplying member for providing the chemical liquid to each of the at least two ink jet heads, and a chemical liquid collecting member for drawing and collecting a chemical liquid remaining in each of the at least two ink jet heads. One path of the chemical liquid from the chemical liquid supplying member to the chemical liquid collecting member via one of the at least two ink jet heads may be substantially the same as a length of another path of the chemical liquid from the chemical liquid supplying member to the chemical liquid collecting member via the other of the at least two ink jet heads.

16 Claims, 2 Drawing Sheets

100

(51) Int. Cl.

| | |
|---|---|
| ***B41J 2/14*** | (2006.01) |
| ***B41J 2/175*** | (2006.01) |

(56) References Cited

U.S. PATENT DOCUMENTS

| | | | | |
|---|---|---|---|---|
| 10,661,575 | B2 * | 5/2020 | Goto | B41J 2/19 |
| 2008/0158307 | A1 * | 7/2008 | Nitta | B41J 2/175 347/85 |
| 2008/0158320 | A1 * | 7/2008 | Nitta | B41J 2/17556 347/89 |
| 2009/0174735 | A1 * | 7/2009 | Yamada | B41J 2/17596 347/7 |
| 2009/0195588 | A1 * | 8/2009 | Ogama | B41J 2/175 347/17 |
| 2014/0104348 | A1 * | 4/2014 | Owaki | B41J 2/18 347/85 |
| 2016/0059565 | A1 | 3/2016 | Akiyama et al. | |

FOREIGN PATENT DOCUMENTS

| | | | |
|---|---|---|---|
| JP | 2007-313884 | A | 12/2007 |
| KR | 10-2014-0064876 | A | 5/2014 |
| KR | 10-2015-0022687 | A | 3/2015 |
| KR | 10-2018-0106841 | A | 10/2018 |
| KR | 10-2020-0143837 | A | 12/2020 |
| WO | WO 99/21721 | A1 | 5/1999 |
| WO | WO 2016/190349 | A1 | 12/2016 |

OTHER PUBLICATIONS

Japanese Office Action/Notice of Reasons for Refusal (with Machine English Translation) dated Aug. 1, 2023 for Japanese Application No. 2022-123743; 8 Pages.

Chinese Office Action (with Machine English Translation from Espacenet.com) dated Apr. 26, 2025 for Chinese Application No. 202210932429.9; 17 Pages.

* cited by examiner

APPARATUSES FOR SUPPLYING CHEMICAL LIQUID

CROSS-REFERENCE TO RELATED APPLICATION

This application claims priority to Korean Patent Application No. 10-2021-0103985 filed on Aug. 6, 2021 in the Korean Intellectual Property Office (KIPO), the contents of which are herein incorporated by reference in its entirety.

BACKGROUND

1. Field

Example embodiments of the invention relate to an apparatus for supplying chemical liquid. More particularly, example embodiments of the invention relate to an apparatus for supplying chemical liquid including at least two ink jet heads substantially arranged in parallel.

2. Related Technology

In processes for manufacturing a display device, a process of providing chemical liquid is performed on a substrate so as to form pixels on a substrate. The process of providing chemical liquid is usually carried out using an apparatus for supplying chemical liquid including an inkjet head for spraying the chemical liquid onto the substrate, a reservoir for storing the chemical liquid, a chemical liquid supplying member for providing the chemical liquid into the inkjet head, and a chemical liquid collecting member for collecting the chemical liquid from the inkjet head.

Recently, an apparatus for supplying chemical liquid may include more than two inkjet heads so that the chemical liquid supplying member may have more than two supply lines and also the chemical liquid collecting member may have more than two recovery lines. Therefore, the configuration of the apparatus for supplying chemical liquid may be complicated and the cost for manufacturing the display device may be increased as well as the reliability of the apparatus for supplying chemical liquid may be decreased.

SUMMARY

Aspects of the invention provide an apparatus for supplying chemical liquid having a circulation configuration including at least two inkjet heads.

According to one aspect of the invention, there is provided an apparatus for supplying chemical liquid which may include at least two ink jet heads arranged in parallel, a reservoir for receiving a chemical liquid provided onto a substrate from each of the at least two ink jet heads, a chemical liquid for supplying member providing the chemical liquid to each of the at least two ink jet heads, and a chemical liquid collecting member for drawing and collecting a chemical liquid remained in each of the at least two ink jet heads. In this case, one path of the chemical liquid from the chemical liquid supplying member to the chemical liquid collecting member via one of the at least two ink jet heads may be substantially the same as a length of another path of the chemical liquid from the chemical liquid supplying member to the chemical liquid collecting member via the other of the at least two ink jet heads.

In example embodiments, the apparatus for supplying chemical liquid may additionally include a pumping member for pumping the chemical liquid from the reservoir to the chemical liquid supplying member and for pumping the remained chemical liquid from the at least two inkjet heads to the chemical liquid collecting member.

In example embodiments, the apparatus for supplying chemical liquid may additionally include an absorbing member for applying an absorption force to the chemical liquid supplying member so as to provide the chemical liquid from the reservoir into the at least two inkjet heads and for applying the absorption force to the chemical liquid collecting member so as to recover the remained chemical liquid from the at least two inkjet heads into the reservoir.

In example embodiments, the absorbing member may apply the absorption force to the chemical liquid supplying member when the chemical liquid is supplied from the reservoir into the at least two inkjet heads, and the absorbing member may not apply the absorption force to the chemical liquid supplying member and/or the chemical liquid collecting member when the chemical liquid is provided onto the substrate from the at least two inkjet heads or when the chemical liquid is circulated through the chemical liquid supplying member, the at least two inkjet heads and the chemical liquid collecting member.

In example embodiments, the chemical liquid supplying member may have a diameter substantially the same as a diameter of the chemical liquid collecting member.

In example embodiments, the apparatus for supplying chemical liquid may additionally include a pressure controlling member for adjusting a negative pressure applied to the reservoir such that a meniscus of the chemical liquid is maintained at ends of nozzles of the at least two inkjet heads while the chemical liquid is sprayed onto the substrate from the nozzles of the at least two inkjet heads.

According to another aspect of the invention, there is provided an apparatus for supplying chemical liquid which may include at least two ink jet heads arranged in parallel, a reservoir for receiving a chemical liquid provided onto a substrate from each of the at least two ink jet heads, a chemical liquid for supplying member providing the chemical liquid to each of the at least two ink jet heads, and a chemical liquid collecting member for drawing and collecting a chemical liquid remained in each of the at least two ink jet heads. In this case, the chemical liquid supplying member may include a supply line connected to the reservoir and divided supply lines connected to the at least two ink jet heads, respectively. Additionally, the chemical liquid collecting member may include a recovery line connected to the reservoir and divided recovery lines connected to the at least two ink jet heads, respectively.

In example embodiments, a first one path of the chemical liquid from one of the divided supply lines to one of the divided recovery lines via one of the at least two ink jet heads may be substantially the same as a length of a second path the of chemical liquid from the other of the divided supply lines to the other of the divided recovery lines via the other of the at least two ink jet heads.

In example embodiments, the apparatus for supplying chemical liquid may additionally include a pumping member for pumping the chemical liquid from the reservoir to the chemical liquid supplying member and for pumping the remained chemical liquid from the at least two inkjet heads to the chemical liquid collecting member.

In example embodiments, the apparatus for supplying chemical liquid may additionally include an absorbing member for applying an absorption force to the chemical liquid supplying member so as to provide the chemical liquid from the reservoir into the at least two inkjet heads and for applying the absorption force to the chemical liquid collecting member so as to recover the remained chemical liquid from the at least two inkjet heads into the reservoir.

In example embodiments, the absorbing member may include a first portion and a second portion, the first portion of the absorbing member may include a first connection line for providing the absorption force to the chemical liquid supplying member and a first valve for opening and closing the first connection line, and the second portion of the absorbing member may include a second connection line for providing the absorption force to the chemical liquid collecting member and a second valve for opening and closing the second connection line.

In example embodiments, the first portion of the absorbing member may apply the absorption force to the chemical liquid supplying member when the chemical liquid is supplied from the reservoir into the at least two inkjet heads, and the first and the second portion of the absorbing member may not apply the absorption force to the chemical liquid supplying member and/or the chemical liquid collecting member when the chemical liquid is provided onto the substrate from the at least two inkjet heads or when the chemical liquid is circulated through the chemical liquid supplying member, the at least two inkjet heads and the chemical liquid collecting member.

In example embodiments, the chemical liquid supplying member may have a diameter substantially the same as a diameter of the chemical liquid collecting member.

In example embodiments, the apparatus for supplying chemical liquid may additionally include a pressure controlling member for adjusting a negative pressure applied to the reservoir such that a meniscus of the chemical liquid is maintained at ends of nozzles of the at least two inkjet heads while the chemical liquid is sprayed onto the substrate from the nozzles of the at least two inkjet heads.

According to still another aspect of the invention, there is provided an apparatus for supplying chemical liquid which may include a first to a fifth ink jet heads arranged in parallel, a reservoir for receiving a chemical liquid provided onto a substrate from each of the first to the fifth ink jet heads, a chemical liquid for supplying member providing the chemical liquid to each of the first to the fifth jet heads, and a chemical liquid collecting member for drawing and collecting a chemical liquid remained in each of the first to the fifth ink jet heads. In this case, the chemical liquid supplying member may include a supply line connected to the reservoir and five divided supply lines connected to the first to the fifth ink jet heads, respectively. Additionally, the chemical liquid collecting member may include a recovery line connected to the reservoir and five divided recovery lines connected to the first to the fifth ink jet heads, respectively.

In some example embodiments, a first one path of the chemical liquid from one of the five divided supply lines to one of the five divided recovery lines via the first ink jet heads may be substantially the same as a length of a second path the of chemical liquid from one of the five divided supply lines to one of the five divided recovery lines via the second ink jet heads, a length of a third path the of chemical liquid from one of the five divided supply lines to one of the five divided recovery lines via the third ink jet heads, a length of a fourth path the of chemical liquid from one of the five divided supply lines to one of the five divided recovery lines via the fourth ink jet heads, and a length of a fifth path the of chemical liquid from one of the five divided supply lines to one of the five divided recovery lines via the fifth ink jet heads.

In some example embodiments, the apparatus for supplying chemical liquid may additionally include a pumping member for pumping the chemical liquid from the reservoir to the chemical liquid supplying member and for pumping the remained chemical liquid from the firth to the fifth inkjet heads to the chemical liquid collecting member.

In some example embodiments, the apparatus for supplying chemical liquid may additionally include an absorbing member for applying an absorption force to the chemical liquid supplying member so as to provide the chemical liquid from the reservoir into the first to the fifth inkjet heads and for applying the absorption force to the chemical liquid collecting member so as to recover the remained chemical liquid from the first to the fifth inkjet heads into the reservoir.

In some example embodiments, a diameter of the supply line may be substantially the same as diameters of the five divided supply lines, a diameter of the recovery line and diameters of the five divided recovery lines.

In some example embodiments, the apparatus for supplying chemical liquid may additionally include a pressure controlling member for adjusting a negative pressure applied to the reservoir such that a meniscus of the chemical liquid is maintained at ends of nozzles of the first to the fifth inkjet heads while the chemical liquid is sprayed onto the substrate from the nozzles of the first to the fifth inkjet heads.

According to example embodiments of the invention, the lengths of the paths of the chemical liquid from the chemical liquid supplying member to the chemical liquid collecting member may be substantially the same so that desired pixels may be uniformly formed on the substrate using the apparatus for supplying chemical liquid and the reliability of the apparatus for supplying chemical liquid may be improved.

BRIEF DESCRIPTION OF THE DRAWINGS

Example embodiments will be more clearly understood from the following detailed description taken in conjunction with the accompanying drawing. The following figures represent non-limiting, example embodiments as described herein.

DESCRIPTION OF EMBODIMENTS

Figure 1:
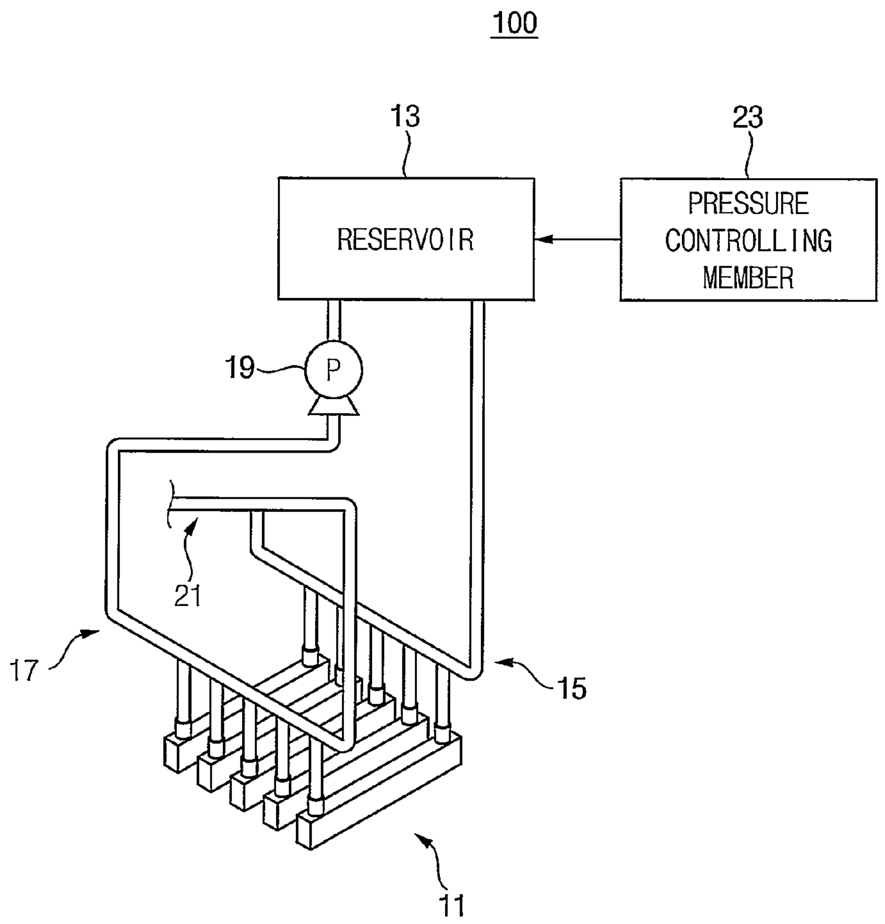
FIG. 1 is a schematic perspective view illustrating an apparatus for supplying chemical liquid in accordance with example embodiments of the invention.

Various embodiments will be described more fully hereinafter with reference to the accompanying drawings, in which some embodiments are shown. The invention may, however, be embodied in many different forms and should not be construed as limited to the embodiments set forth herein. Rather, these embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (for example, rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include a plurality of forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the face through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described in detail with reference to the accompanying drawings. Like elements or components can be indicated by like reference numerals throughout the drawings, and the repeated explanations of like elements or components may be omitted.

Figure 2:
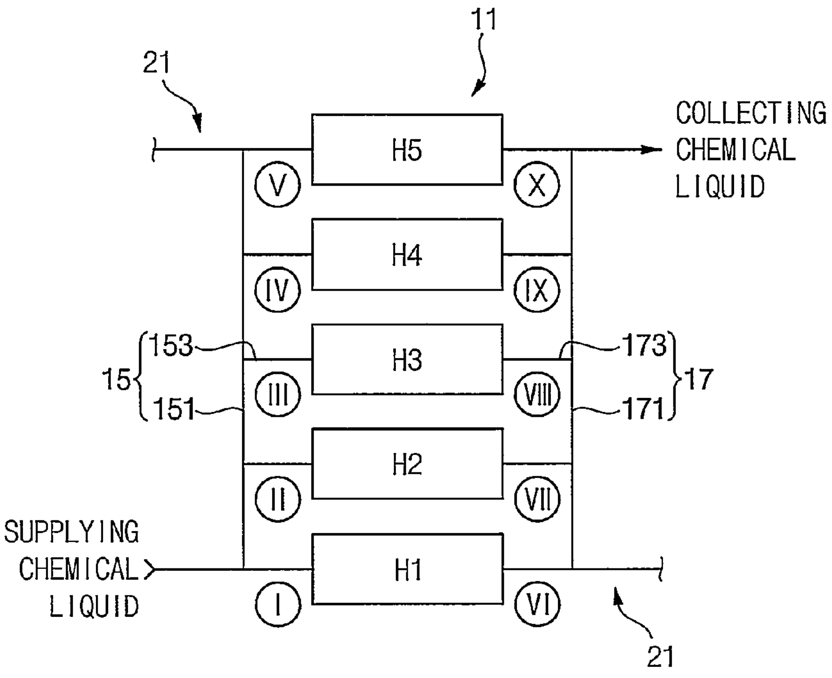
FIG. 2 is a schematic block diagram illustrating an apparatus for supplying chemical liquid in accordance with example embodiments of the invention.

FIG. 1 is a schematic perspective view illustrating an apparatus for supplying chemical liquid in accordance with example embodiments of the invention. FIG. 2 is a schematic block diagram illustrating an apparatus for supplying chemical liquid in accordance with example embodiments of the invention.

Referring to FIG. 1, an apparatus for supplying chemical liquid 100 may be employed in processes for manufacturing a display device such as an organic light emitting display (OLED) device, quantum dot light emitting display device (QLED) device, etc. For example, the apparatus for supplying chemical liquid 100 may be used in a process for forming predetermined pixels such as red pixels, green pixels and blue pixels on a substrate. In example embodiments, the apparatus for supplying chemical liquid 100 may include at least two inkjet heads 11, a reservoir 13, a chemical liquid supplying member 15, a chemical liquid collecting member 17, a pumping member 19, an absorbing member 21, a pressure controlling member 23, etc.

In example embodiments, each of the at least two inkjet heads 11 may include a plurality of nozzles capable of spraying the chemical liquid onto the substrate. For example, each of the at least two inkjet heads 11 may include about 128 or about 256 nozzles, respectively. Here, the plurality of nozzles may be arranged by a predetermined distances. In addition, each of the plurality of nozzles may provide the chemical liquid onto the substrate by the unit of microgram.

In example embodiments, each of the at least two inkjet heads 11 may additionally include a plurality of piezoelectric elements and the number of the piezoelectric elements may be substantially the same as the number of the nozzles. Each of the piezoelectric elements may be adjacent to each of the nozzles such that the chemical liquid may be sprayed from the nozzles onto the substrate by the operations of the piezoelectric elements. In this case, the amount of the chemical liquid provided from the nozzles onto the substrate may be adjusted by controlling the voltages applied to the piezoelectric elements, respectively.

In the apparatus for supplying chemical liquid 100, the at least two inkjet heads 11 may be disposed substantially in parallel. In the embodiments illustrated in FIG. 1, the apparatus for supplying chemical liquid 100 may include five inkjet heads 11 and the five inkjet heads 11 may be spaced apart by substantially regular intervals.

The reservoir 13 of the apparatus for supplying chemical liquid 100 may receive the chemical liquid provided onto the substrate through the at least two inkjet heads 11. In example embodiments, the chemical liquid may be supplied into the reservoir 13 from a chemical liquid storage tank (not shown) such as a canister, and then the chemical liquid may be stored in the reservoir 13 for a predetermined process performed using the apparatus for supplying chemical liquid 100. Additionally, the reservoir 13 may receive the chemical liquid recovered and collected from each of the at least two inkjet heads 11 using the chemical liquid collecting member 17.

The chemical liquid supplying member 15 may provide the chemical liquid from the reservoir 13 to each of the at least two inkjet heads 11. The chemical liquid collecting member 17 may recover and collect the chemical liquid from the at least two inkjet heads 11 into the reservoir 13. The chemical liquid supplying member 15 and the chemical liquid collecting member 17 will be described in detail below.

In example embodiments, the apparatus for supplying chemical liquid 100 may include the chemical liquid supplying member 15 and the chemical liquid collecting member 17 such that the apparatus for supplying chemical liquid 100 may have a circulation configuration in which the chemical liquid may circulated via the at least two inkjet heads 11 (for example, through the five inkjet heads 11) from the chemical liquid supplying member 15 into the chemical liquid collecting member 17. In this case, chemical liquid collecting member 17 may recover the chemical liquid remained in each of the at least two inkjet heads 11, may collect the recovered chemical liquid, and then may direct the collected chemical liquid into the reservoir 13. A portion of the chemical liquid may not be sprayed onto the substrate from the at least two inkjet heads 11 and may be remained in the inkjet heads 11 while the predetermined process is performed on the substrate using the apparatus for supplying chemical liquid 100. Here, the chemical liquid collecting member 17 may draw and collect the remained chemical liquid from the inkjet heads 11 and the reservoir 13 may receive the collected chemical liquid.

Hereinafter, it will be described in more detail the circulation configuration of the apparatus for supplying chemical liquid 100 including the reservoir 13, the chemical liquid supplying member 15, the at least two inkjet heads 11 and the chemical liquid collecting member 17.

Referring to FIG. 1 and FIG. 2, the chemical liquid supplying member 15 may include a first portion in fluid communication with the reservoir 13 and a second portion in fluid communication with each of the at least two inkjet heads 11. The second portion of the chemical liquid supplying member 15 may have at least two divided supply lines corresponding to the at least two inkjet heads 11, respectively. In some example embodiments, the second portion of the chemical liquid supplying member 15 may have five divided supply lines when the apparatus for supplying chemical liquid 100 includes five inkjet heads 11. The second portion of the chemical liquid supplying member 15 may be parallelly extended relative to the five inkjet heads 11 and the five divided supply lines of the second portion may be connected to the five inkjet heads 11, respectively.

As illustrated in FIG. 2, when the apparatus for supplying chemical liquid 100 includes five inkjet heads H1, H2, H3, H4 and H5, the chemical liquid supplying member 15 may include a supply line 151 extended in parallel to the five inkjet heads H1, H2, H3, H4 and H5, and five divided supply lines 153 connected to the five inkjet heads H1, H2, H3, H4 and H5, respectively. In this case, the five divided supply lines 153 may have the same length between the supply line 151 and the five inkjet heads H1, H2, H3, H4 and H5. Therefore, the chemical liquid may be uniformly provided to the five inkjet heads H1, H2, H3, H4 and H5 from the reservoir 13 through the chemical liquid supplying member 15.

The chemical liquid collecting member 17 may recover the chemical liquid remained in the at least two inkjet heads 11 and may collect the recovered chemical liquid from the at least two inkjet heads 11. The chemical liquid collecting member 17 may include a first portion in fluid communication with the at least two inkjet heads 11 and a second portion in fluid communication with the reservoir 13 through the pumping member 19. The first portion of the chemical liquid collecting member 17 may have at least two divided recovery lines corresponding to the at least two inkjet heads 11, respectively.

In some example embodiments, as illustrated in FIG. 2, the first portion of the chemical liquid collecting member 17 may include a recovery line 171 extended in parallel to the five inkjet heads H1, H2, H3, H4 and H5, and five divided recovery lines 173 connected to the five inkjet heads H1, H2, H3, H4 and H5, respectively. Here, the five divided recovery lines 173 may have the substantially same length between recovery line 171 and the five inkjet heads H1, H2, H3, H4 and H5. Therefore, the remained chemical liquid may be simultaneously recovered and collected from the inkjet heads H1, H2, H3, H4 and H5, and the collected chemical liquid may be stored in the reservoir 13.

As described above, the apparatus for supplying chemical liquid 100 may include the circulation configuration which may include the reservoir 13, the chemical liquid supplying member 15 having the supply line 151 and the divided supply line 153, the inkjet heads H1, H2, H3, H4 and H5, and the chemical liquid collecting member 17 having the recovery line 171 and the divided recovery lines 173.

The circulation configuration of the apparatus for supplying chemical liquid 100 may include at least two paths. For example, the circulation configuration may include a first path passing through one of the at least two inkjet heads 11 and a second path passing through the other of the at least two inkjet heads 11. In some example embodiments, the circulation configuration may include five paths. More specifically, as illustrated in FIG. 2, the circulation configuration may include a first path from one of the divided supply lines 153 to one of the divided recovery lines 173 through one end I and the other end VI of a first inkjet head H1, a second path from one of the divided supply lines 153 to one of the divided recovery lines 173 through one end II and the other end VII of a second inkjet head H2, a third path from one of the divided supply lines 153 to one of the divided recovery lines 173 through one end III and the other end VIII of a third inkjet head H3, a fourth path from one of the divided supply lines 153 to one of the divided recovery lines 173 through one end IV and the other end IX of a fourth inkjet head H4, and a fifth path from one of the divided supply lines 153 to one of the divided recovery lines 173 through one end V and the other end X of a fifth inkjet head H5. In this case, the first path to the fifth path may be the substantially same length. Thus, the chemical liquid may be uniformly provided to the first to the fifth inkjet heads H1, H2, H3, H4 and H5, and also the remaining chemical liquid may be simultaneously drawn from the first to the fifth inkjet heads H1, H2, H3, H4 and H5.

In the above-described circulation configuration, a supply path for the chemical liquid provided from the supply line 151 and the divided supply lines 153 to the inkjet heads H1, H2, H3, H4 and H5 may have a length substantially the same as a length of a recovery path for the chemical liquid drawn from the inkjet heads H1, H2, H3, H4 and H5 to the divided recovery lines 173 and the recovery line 171.

Figure 3:
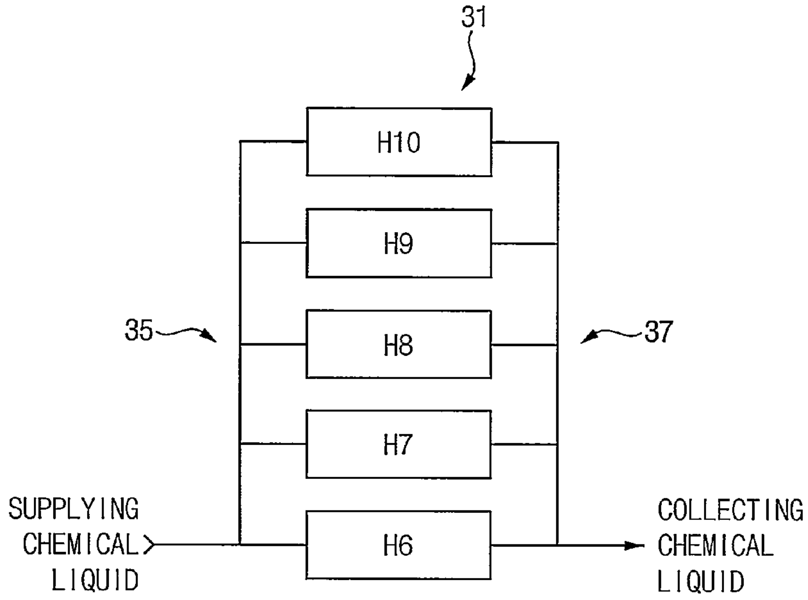
FIG. 3 is a schematic block diagram illustrating an apparatus for supplying chemical liquid in accordance with a comparative embodiment of the invention.

FIG. 3 is a schematic block diagram illustrating an apparatus for supplying chemical liquid in accordance with a comparative embodiment of the invention.

Referring to FIG. 3, the apparatus for supplying chemical liquid according to the comparative embodiment may include a chemical liquid supplying member 35 and a chemical liquid collecting member 37. Here, the chemical liquid supplying member 35 may have one supply line and five divided supply lines coupled to five inkjet heads H6, H7, H8, H9 and H10, respectively. The chemical liquid collecting member 37 may have one recovery line and five divided recovery lines connected to the five inkjet heads H6, H7, H8, H9 and H10, respectively.

As illustrated in FIG. 3, the apparatus for supplying chemical liquid according to the comparative embodiment may have the circulation configuration including five paths from the chemical liquid supplying member 35 to the chemical liquid collecting member 37. However, the paths of such circulation configuration are different from one after another. More specifically, a length of a sixth path from the supply line to the recovery line via one the divided supply lines, a sixth inkjet head H6 and one the divided recovery lines is different from a length of seventh path from the supply line to the recovery line via one the divided supply lines, a seventh inkjet head H7 and one the divided recovery lines. Likewise, a length of an eighth path passing through an eight inkjet head H8 is different from the length of the seventh path and the length of the sixth path. In addition, a length of a ninth path passing through a ninth inkjet head H9 is different from the length of an eighth path, the length of the seventh path and the length of the sixth path. Moreover, a length of a tenth path passing through a tenth inkjet head H10 is different from the length of a ninth path, the length of an eighth path, the length of the seventh path and the length of the sixth path. In other words, the lengths are increased from the sixth path to the tenth length in the circulation configuration of the apparatus for supplying chemical liquid according to the comparative embodiment. As a result, pixels may not be uniformly formed on a substrate using the apparatus for supplying chemical liquid and the reliability of the apparatus for supplying chemical liquid may be reduced. By contrast, the apparatus for supplying chemical liquid 100 according to example embodiments may include the first path to the fifth path having substantially the same lengths from the chemical liquid supplying member 15 to the chemical liquid collecting member 17 so that the desired pixels may be uniformly formed on the substrate and the reliability of the apparatus for supplying chemical liquid 100 may be improved.

Referring now to FIG. 1 and FIG. 2, the chemical liquid supplying member 15 may have a diameter substantially the same as a diameter of the chemical liquid collecting member 17. That is, each of the supply line 151, the divided supply lines 153, the recovery line 171 and the divided recovery lines 173 may have a substantially identical diameter. Therefore, the chemical liquid may be provided to the at least two inkjet heads 11 through the supply line 151 and the divided supply lines 153 by substantially the same amount. Additionally, the remaining chemical liquid may be simultaneously drawn from the at least two inkjet heads 11 through the divided recovery lines 173 and the recovery line 171. As a result, the desired pixels may be more uniformly formed on the substrate and the reliability of the apparatus for supplying chemical liquid 100 may be further improved.

As illustrated in FIG. 1, the pumping member 19 may pump the remaining chemical liquid from the at least two inkjet heads 11 into the reservoir 13. In addition, the pumping member 19 may pump the chemical liquid such that chemical liquid may pass through the chemical liquid supplying member 15, the at least two inkjet heads 11 and the chemical liquid collecting member 17. In other words, the pumping member 19 may enable the chemical liquid to circulate in the circulation configuration of the apparatus for supplying chemical liquid 100. For example, the pumping member 19 may include a motor such as an electric motor, a three phase motor, etc.

In example embodiments, the pumping member 19 may be disposed between the chemical liquid collecting member 17 and the reservoir 13. The chemical liquid remained in the at least two inkjet heads 11 may be easily and rapidly recovered and collected into the reservoir 13. If the chemical liquid remains in the at least two inkjet heads 11, precipitate caused by the chemical liquid may be formed in the at least two inkjet heads 11 such that the nozzles of the at least two inkjet heads 11 may be clogged by the precipitate. The pumping member 19 may prevent the precipitate from being formed in the at least two inkjet heads 11, and thus may minimize the failure of the process performed using the apparatus for supplying chemical liquid 100.

In example embodiments, the absorbing member 21 may an absorption force to the chemical liquid supplying member 15 and/or the chemical liquid collecting member 17. That is, the absorbing member 21 may apply the absorption force to the chemical liquid supplying member 15 so that the chemical liquid may flow from the reservoir 13 into the at least two inkjet heads 11. Further, the absorbing member 21 may apply the absorption force to the chemical liquid collecting member 17 such that the remaining chemical liquid may flow from the at least two inkjet heads 11 into the reservoir 13. Particularly, the absorbing member 21 may advantageously provide the absorption force to the chemical liquid collecting member 17 when the at least two inkjet heads 11 are checked for the maintenance. Additionally, the absorbing member 21 may advantageously apply the absorption force to the chemical liquid supplying member 15 when the chemical liquid is provided again to the at least two inkjet heads 11 after the maintenance of the at least two inkjet heads 11.

In some example embodiments, the absorbing member 21 may have a first portion connected to the chemical liquid supplying member 15 and a second portion connected to the chemical liquid collecting member 17. The first portion of the absorbing member 21 may include a first connection line and a first valve. Here, the first connection line may provide the absorption force to the chemical liquid supplying member 15 and the first valve may open and close the first connection line. Similarly, the second portion of the absorbing member 21 may include a second connection line and a second valve. The second connection line may provide the absorption force to the chemical liquid collecting member 17 and the second valve may open and close the second connection line. For example, the first connection line of the absorbing member 21 may be connected to the supply line 151 of the chemical liquid supplying member adjacent to the fifth inkjet head H1. In addition, the second connection line of the absorbing member 21 may be connected to the recovery line 171 of the chemical liquid collecting member 17 adjacent to the first inkjet head H1. In this case, the first valve and the second valve may open the first connection line and the second connection line, respectively, when the chemical liquid is provided again into the first to the fifth inkjet heads H1, H2, H3, H4 and H5 after the maintenance. The first valve and the second valve may respectively open the first connection line and the second connection line when the chemical liquid is sprayed onto the substrate from the first to the fifth inkjet heads H1, H2, H3, H4 and H5 or when the chemical liquid is circulated in the circulation configuration including the chemical liquid supplying member 15 and the chemical liquid collecting member 17.

As described above, the apparatus for supplying chemical liquid 100 may include the absorbing member 21 so that the chemical liquid may be rapidly supplied into the at least two inkjet heads 11 by applying the absorption force to the chemical liquid supplying member 15 and the remaining chemical liquid may be quickly drawn from the at least two inkjet heads 11 by providing the absorption force to the chemical liquid collecting member 17. In fact, the time for providing the chemical liquid to the first to the fifth inkjet heads H1, H2, H3, H4 and H5 illustrated in FIG. 2 was reduced by about 6% as compared to the time for providing the chemical liquid to the sixth to the tenth inkjet heads H6, H7, H8, H9 and H20 illustrated in FIG. 3. That is, the time for the fifth inkjet heads H1, H2, H3, H4 and H5 was about 94% of the time for the sixth to the tenth inkjet heads H6, H7, H8, H9 and H20.

Referring now to FIG. 1, the pressure controlling member 23 may adjust a negative pressure applied to the reservoir 13 while performing the process using the apparatus for supplying chemical liquid 100. For example, the pressure controlling member 23 may include a vacuum pump capable of reducing the internal pressure of the reservoir 13 by applying a suction force to the reservoir 13. The pressure controlling member 23 may maintain the meniscus of the chemical liquid at the ends of the nozzles when the chemical liquid is sprayed onto the substrate from the at least two inkjet heads 11. In other words, the pressure controlling member 23 may adjust the negative pressure applied to the chemical liquid received in the reservoir 13 so that the meniscus of the chemical liquid may be maintained at the ends of the nozzles. Therefore, it may be prevented the unintended spray of the chemical liquid onto the substrate from the nozzles of the at least two inkjet heads 11.

Experiments for the Flow Rates of the Chemical Liquid in the Inkjet Heads

About 6.33 cc per minute of chemical liquid was circulated in an apparatus for supplying chemical liquid including five inkjet heads configured in one unit as illustrated in FIG. 2, a chemical liquid supplying member having a diameter of about 4 mm and a chemical liquid collecting member having a diameter of about 4 mm while maintaining about −3,500 pa of negative pressure in the apparatus for supplying chemical liquid.

The flow rate of the chemical liquid at one end of the first inkjet head H1 was about 1.525 cc, the flow rate of the chemical liquid at one end of the second inkjet head H2 was about 1.126 cc, and the flow rate of the chemical liquid at one end of the third inkjet head H3 was about 1.002 cc. The flow rate of the chemical liquid at one end of the fourth inkjet head H4 was about 1.124 cc and the flow rate of the chemical liquid at one end of the fifth inkjet head H5 was about 1.521 cc.

Further, about 6.7 cc per minute of chemical liquid was circulated in an apparatus for supplying chemical liquid including five inkjet heads configured in one unit as illustrated in FIG. 2, a chemical liquid supplying member having a diameter of about 6 mm and a chemical liquid collecting member having a diameter of about 6 mm while maintaining about −3,500 pa of negative pressure in the apparatus for supplying chemical liquid.

The flow rate of the chemical liquid at one end of the first inkjet head H1 was about 1.390 cc, the flow rate of the chemical liquid at one end of the second inkjet head H2 was about 1.302 cc, and the flow rate of the chemical liquid at one end of the third inkjet head H3 was about 1.277 cc. The flow rate of the chemical liquid at one end of the fourth inkjet head H4 was about 1.307 cc and the flow rate of the chemical liquid at one end of the fifth inkjet head H5 was about 1.391 cc.

As noted above, it can be identified that the flow rates of the chemical liquid provided to the inkjet heads of the apparatus for supplying chemical liquid were very similar. That is, it can be seen that the amounts of the chemical liquid provided to the inkjet heads were substantially identical since the difference between the flow rates of the chemical liquid flowed into the inkjet heads was very small. Therefore, it can be identified that the chemical liquid may be uniformly provided to the inkjet heads.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. An apparatus for supplying chemical liquid, comprising:

at least two ink jet heads arranged in parallel;

a reservoir for receiving a chemical liquid provided onto a substrate from each of the at least two ink jet heads;

a chemical liquid supplying member for providing the chemical liquid to each of the at least two ink jet heads, wherein the chemical liquid supplying member includes a supply line;

a chemical liquid collecting member for drawing and collecting a chemical liquid remaining in each of the at least two ink jet heads, wherein the chemical liquid collecting member includes a recovery line, wherein one path of the chemical liquid from the chemical liquid supplying member to the chemical liquid collecting member via one of the at least two ink jet heads is the same as a length of another path of the chemical liquid from the chemical liquid supplying member to the chemical liquid collecting member via the other of the at least two ink jet heads; and an absorbing member including a first portion connected to the supply line of the chemical liquid supplying member for applying an absorption force to the chemical liquid supplying member so as to provide the chemical liquid from the reservoir into the at least two inkjet heads and including a second portion connected to the recovery line of the chemical collecting member for applying the absorption force to the chemical liquid collecting member so as to recover the remaining chemical liquid from the at least two inkjet heads into the reservoir.

2. The apparatus for supplying chemical liquid of claim 1, further comprising a pumping member for pumping the chemical liquid from the reservoir to the chemical liquid supplying member and for pumping the remaining chemical liquid from the at least two inkjet heads to the chemical liquid collecting member.

3. The apparatus for supplying chemical liquid of claim 1, wherein the absorbing member applies the absorption force to the chemical liquid supplying member when the chemical liquid is supplied from the reservoir into the at least two inkjet heads, and the absorbing member does not apply the absorption force to the chemical liquid supplying member and/or the chemical liquid collecting member when the chemical liquid is provided onto the substrate from the at least two inkjet heads or when the chemical liquid is circulated through the chemical liquid supplying member, the at least two inkjet heads and the chemical liquid collecting member.

4. The apparatus for supplying chemical liquid of claim 1, wherein the chemical liquid supplying member has a diameter the same as a diameter of the chemical liquid collecting member.

5. The apparatus for supplying chemical liquid of claim 1, further comprising a pressure controlling member for adjusting a negative pressure applied to the reservoir such that a meniscus of the chemical liquid is maintained at ends of nozzles of the at least two inkjet heads while the chemical liquid is sprayed onto the substrate from the nozzles of the at least two inkjet heads.

6. An apparatus for supplying chemical liquid, comprising:

at least two ink jet heads arranged in parallel;

a reservoir for receiving a chemical liquid provided onto a substrate from each of the at least two ink jet heads;

a chemical liquid supplying member for providing the chemical liquid to each of the at least two ink jet heads;

a chemical liquid collecting member for drawing and collecting a chemical liquid remaining in each of the at least two ink jet heads, wherein the chemical liquid supplying member includes a supply line connected to the reservoir and divided supply lines connected to the at least two ink jet heads, respectively, and wherein the chemical liquid collecting member includes a recovery line connected to the reservoir and divided recovery lines connected to the at least two ink jet heads, respectively; and an absorbing member for applying an absorption force to the chemical liquid supplying member so as to provide the chemical liquid from the reservoir into the at least two inkjet heads and for applying the absorption force to the chemical liquid collecting member so as to recover the remaining chemical liquid from the at least two inkjet heads into the reservoir, wherein the absorbing member comprises a first portion of the absorbing member that includes a first connection line connected to the supply line of the chemical liquid supplying member for providing the absorption force to the chemical liquid supplying member, and a second portion of the absorbing member that includes a second connection line connected to the recovery line of the chemical liquid collecting member for providing the absorption force to the chemical liquid collecting member.

7. The apparatus for supplying chemical liquid of claim 6, wherein a length of a first one path of the chemical liquid from one of the divided supply lines to one of the divided recovery lines via one of the at least two ink jet heads is the same as a length of a second path of the chemical liquid from the other of the divided supply lines to the other of the divided recovery lines via the other of the at least two ink jet heads.

8. The apparatus for supplying chemical liquid of claim 6, further comprising a pumping member for pumping the chemical liquid from the reservoir to the chemical liquid supplying member and for pumping the remaining chemical liquid from the at least two inkjet heads to the chemical liquid collecting member.

9. The apparatus for supplying chemical liquid of claim 6, wherein the first portion of the absorbing member applies the absorption force to the chemical liquid supplying member when the chemical liquid is supplied from the reservoir into the at least two inkjet heads, and the first and the second portion of the absorbing member does not apply the absorption force to the chemical liquid supplying member and/or the chemical liquid collecting member when the chemical liquid is provided onto the substrate from the at least two inkjet heads or when the chemical liquid is circulated through the chemical liquid supplying member, the at least two inkjet heads and the chemical liquid collecting member.

10. The apparatus for supplying chemical liquid of claim 6, wherein the chemical liquid supplying member has a diameter the same as a diameter of the chemical liquid collecting member.

11. The apparatus for supplying chemical liquid of claim 6, further comprising a pressure controlling member for adjusting a negative pressure applied to the reservoir such that a meniscus of the chemical liquid is maintained at ends of nozzles of the at least two inkjet heads while the chemical liquid is sprayed onto the substrate from the nozzles of the at least two inkjet heads.

12. An apparatus for supplying chemical liquid, comprising:

a first to a fifth ink jet heads arranged in parallel;

a reservoir for receiving a chemical liquid provided onto a substrate from each of the first to the fifth ink jet heads;

a chemical liquid supplying member for providing the chemical liquid to each of the first to the fifth jet heads;

a chemical liquid collecting member for drawing and collecting a chemical liquid remaining in each of the first to the fifth ink jet heads, wherein the chemical liquid supplying member includes a supply line connected to the reservoir and five divided supply lines connected to the first to the fifth ink jet heads, respectively, and wherein the chemical liquid collecting member includes a recovery line connected to the reservoir and five divided recovery lines connected to the first to the fifth ink jet heads, respectively; and an absorbing member for applying an absorption force to the chemical liquid supplying member so as to provide the chemical liquid from the reservoir into the first to the fifth inkjet heads and for applying the absorption force to the chemical liquid collecting member so as to recover the remaining chemical liquid from the first to the fifth inkjet heads into the reservoir, wherein the absorbing member comprises a first portion of the absorbing member that includes a first connection line connected to the supply line of the chemical liquid supplying member for providing the absorption force to the chemical liquid supplying member, and a second portion of the absorbing member that includes a second connection line connected to the recovery line of the chemical liquid collecting member for providing the absorption force to the chemical liquid collecting member.

13. The apparatus for supplying chemical liquid of claim 12, wherein a length of a first one path of the chemical liquid from one of the five divided supply lines to one of the five divided recovery lines via the first ink jet heads is the same as a length of a second path of the chemical liquid from one of the five divided supply lines to one of the five divided recovery lines via the second ink jet heads, a length of a third path of the chemical liquid from one of the five divided supply lines to one of the five divided recovery lines via the third ink jet heads, a length of a fourth path of the chemical liquid from one of the five divided supply lines to one of the five divided recovery lines via the fourth ink jet heads, and a length of a fifth path of the chemical liquid from one of the five divided supply lines to one of the five divided recovery lines via the fifth ink jet heads.

14. The apparatus for supplying chemical liquid of claim 12, further comprising a pumping member for pumping the chemical liquid from the reservoir to the chemical liquid supplying member and for pumping the remaining chemical liquid from the first to the fifth inkjet heads to the chemical liquid collecting member.

15. The apparatus for supplying chemical liquid of claim 12, wherein a diameter of the supply line is the same as diameters of the five divided supply lines, a diameter of the recovery line and diameters of the five divided recovery lines.

16. The apparatus for supplying chemical liquid of claim 12, further comprising a pressure controlling member for adjusting a negative pressure applied to the reservoir such that a meniscus of the chemical liquid is maintained at ends of nozzles of the first to the fifth inkjet heads while the chemical liquid is sprayed onto the substrate from the nozzles of the first to the fifth inkjet heads.

* * * * *